United States Patent
Pantelidou (10) Patent No.: US 10,932,182 B2
(45) Date of Patent: Feb. 23, 2021

(54) ON-DEMAND ACQUISITION METHOD AND DEVICE OF SYSTEM INFORMATION

(71) Applicant: SPREADTRUM COMMUNICATIONS (SHANGHAI) CO., LTD., Shanghai (CN)

(72) Inventor: Anna Pantelidou, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/828,383

(22) Filed: Nov. 30, 2017

(65) Prior Publication Data

US 2018/0199266 A1    Jul. 12, 2018

(30) Foreign Application Priority Data

Jan. 6, 2017   (CN) .......................... 201710010914.X (51) Int. Cl.
H04W 48/10       (2009.01)
H04W 72/04       (2009.01)
(Continued)

(52) U.S. Cl.
CPC ........... H04W 48/10 (2013.01); H04W 48/14 (2013.01); H04W 72/0446 (2013.01);
(Continued)

(58) Field of Classification Search
CPC . H04W 48/10; H04W 48/14; H04W 72/0446; H04W 74/0833; H04L 5/0048; H04L 5/0053
See application file for complete search history.

(56) References Cited

U.S. PATENT DOCUMENTS

| | | | | |
|---|---|---|---|---|
| 8,243,667 B2* | 8/2012 | Chun | ................ | H04W 74/0833 370/329 |
| 8,761,096 B2* | 6/2014 | Chun | .................. | H04W 74/006 370/329 |

(Continued)

FOREIGN PATENT DOCUMENTS

| | | |
|---|---|---|
| CN | 102422568 A | 4/2012 |
| CN | 106171011 A | 11/2016 |

OTHER PUBLICATIONS

Samsung, "System Information Signalling Design in NR", SGPP TSG-RAN WG2 Meeting #95, R2-164693, Gothenburg, Sweden, Aug. 22-26, 2016, 7 pages.

*Primary Examiner* — Huy D Vu
*Assistant Examiner* — Bailor C. Hsu
(74) *Attorney, Agent, or Firm* — Kilpatrick Townsend & Stockton, LLP (57) ABSTRACT

On-demand acquisition method and device of SI are provided. The method includes transmitting a random access preamble to a network, and the random access preamble is used at least for requesting the SI, acquiring indication information related to the SI based on a random access response received from the network; and acquiring the SI, based on the indication information, from the network in broadcast or unicast mode, and the indication information is used for indicating time sequence information and a mode of acquiring the SI. Interaction process between the UE and the network may be simplified, which further effectively reduces signaling overhead during the interaction and avoids a waste of resources.

22 Claims, 6 Drawing Sheets

(51) Int. Cl.
*H04W 74/08* (2009.01)
*H04W 48/14* (2009.01)
*H04L 5/00* (2006.01)

(52) U.S. Cl.
CPC .......... *H04L 5/0048* (2013.01); *H04L 5/0053* (2013.01); *H04W 74/0833* (2013.01)

(56) References Cited

U.S. PATENT DOCUMENTS

| | | | | |
|---|---|---|---|---|
| 8,842,567 | B2* | 9/2014 | Lee | H04W 74/006 |
| | | | | 370/252 |
| 9,240,846 | B2* | 1/2016 | Koo | H04B 15/00 |
| 9,554,399 | B2* | 1/2017 | Zhang | H04W 76/27 |
| 9,769,700 | B2* | 9/2017 | Rune | H04W 74/006 |
| 9,992,739 | B2* | 6/2018 | Rune | H04W 72/042 |
| 10,009,768 | B2* | 6/2018 | Vutukuri | H04W 48/14 |
| 2009/0175253 | A1* | 7/2009 | Wu | H04W 99/00 |
| | | | | 370/338 |
| 2010/0232364 | A1* | 9/2010 | Hsu | H04W 74/085 |
| | | | | 370/328 |
| 2010/0278064 | A1 | 11/2010 | Jeong | |
| 2014/0226614 | A1* | 8/2014 | Kato | H04W 74/08 |
| | | | | 370/329 |
| 2016/0234736 | A1* | 8/2016 | Kubota | H04W 36/0083 |
| 2017/0048906 | A1* | 2/2017 | Lee | H04W 76/14 |
| 2018/0288683 | A1* | 10/2018 | Bendlin | H04W 48/14 |

* cited by examiner

ON-DEMAND ACQUISITION METHOD AND DEVICE OF SYSTEM INFORMATION

CROSS-REFERENCE TO RELATED APPLICATIONS

The present application claims priority to Chinese patent application No. 201710010914.X, filed on Jan. 6, 2017, and entitled "ON-DEMAND ACQUISITION METHOD AND DEVICE OF SYSTEM INFORMATION", and the entire disclosure of which is incorporated herein by reference.

TECHNICAL FIELD

The present disclosure generally relates to communication technology field, and more particularly, to on-demand acquisition method and device of system information.

BACKGROUND

According to regulations in 3rd Generation Partnership Project (3GPP) protocol, existing system information is generally transmitted from a network to a User Equipment (UE) by broadcasting.

For example, in Long Term Evolution (LTE) technology, system information (SI) includes Master Information Block (MIB) information and System Information Block (SIB) information. The broadcasting periods of the MIB information and a portion of the SIB information are fixed, while the broadcasting periods of other portions of the SIB information are configurable within a fixed range. Even if the UE does not need to acquire the system information at present, the UE still monitors content broadcasted in a broadcast channel all the time to acquire the MIB information and SIB information.

In a New Radio (NR) technology, Minimum System Information (MSI) must be broadcasted, and Other System Information (OSI) may be broadcasted in a configurable period, or be transmitted in on-demand broadcast or on-demand unicast mode. In an existing proposal, MSI is broadcasted in a fixed period, and OSI is transmitted in on-demand broadcast or on-demand unicast mode. The on-demand broadcast of OSI includes: a UE in idle mode transmitting a preamble of system information through a Physical Random Access Channel (PRACH) to inform a network that it may send an on-demand SI request; Upon reception of random access response from the network a UE transmitting the on-demand SI request; upon reception of SI request a network broadcasting a SI response in resources that the network has reserved for broadcast of SI in the downlink based on the on-demand SI request (if no UE requests SI, the resources can be used for other transmissions); and a UE acquiring SI through a broadcast channel. In case of on-demand unicast, a UE in idle mode needs to set up a Radio Resource Control (RRC) connection in advance to transmit the SI request and receive the SI response under the RRC connection in unicast.

In the NR technology, one agreement regarding SI is that a UE that requests OSI from idle or "RRC Inactive" should be able to do it without transitioning to a different state, e.g., to connected state.

The above on-demand broadcast or unicast method may satisfy the demand that the UE does not want to monitor the broadcast channel all the time to acquire the SI to some extent. However, a practical realization procedure of the above method is relatively complicated, where multiple times of interaction between the UE and the network are required to obtain the needed SI. In another proposal, similar approaches are being proposed where SI request and SI response are separate messages. In practice, SI needs to be transmitted through a dedicated signaling in the SI response, which may cause extra signaling overhead and new information in the network to result in a waste of resources.

SUMMARY

In the existing techniques, transmitting and receiving SI causes a large amount of signaling overhead in the network, which results in a waste of resources. Embodiments of the present disclosure aim to solve the problems.

In an embodiment, an on-demand acquisition method of SI is provided, including: transmitting a random access preamble to a network, and the random access preamble is used at least for requesting the SI; acquiring indication information related to the SI based on a random access response received from the network; and acquiring the SI, based on the indication information, from the network in broadcast or unicast mode, and the indication information is used at least for indicating time sequence information and a mode of acquiring the SI.

In one embodiment, acquiring indication information related to the SI based on a random access response received from the network may include: acquiring the indication information from a portion of or all the fields in the random access response according to guide information, and the guide information is received with the receipt of the random access response.

In one embodiment, acquiring the indication information from a portion of or all the fields in the random access response according to guide information may include: if the guide information indicates that a portion of the fields in the random access response are used to record the indication information, acquiring the indication information from the portion of the fields.

In one embodiment, the portion of the fields may include at least one of an uplink grant field and a time advance command field.

In one embodiment, acquiring the indication information from a portion of or all the fields in the random access response according to guide information may include: if the guide information indicates that all the fields in the random access response are used to record the indication information, acquiring the indication information from all the fields.

In one embodiment, the random access preamble may be only used for requesting the SI.

In one embodiment, the indication information may be used for indicating to receive the SI in a broadcast mode in a predetermined time period, and acquiring the SI, based on the indication information, from the network in broadcast or unicast mode comprises: receiving the SI, based on the indication information, from the network in a broadcast mode in the predetermined time period.

In one embodiment, the random access preamble may be used for requesting the SI and other operation.

In one embodiment, the other operation may include transmitting data to the network.

In one embodiment, the method may further include: prior to or following acquiring the SI, based on the indication information, from the network in broadcast or unicast mode, setting up an RRC connection with the network; and performing the other operation based on the RRC connection.

In one embodiment, the indication information may be used for indicating to receive the SI in a broadcast mode in a predetermined time period, and acquiring the SI, based on the indication information, from the network in broadcast or unicast mode comprises: receiving the SI, based on the indication information, in a broadcast mode in the predetermined time period.

In one embodiment, the indication information may be used for indicating to receive the SI in a unicast mode in a predetermined time period, and acquiring the SI, based on the indication information, from the network in broadcast or unicast mode comprises: receiving the SI, based on the indication information, in a unicast mode in the predetermined time period.

In one embodiment, the SI may include other SI except mandatory SI.

In one embodiment, the mode of acquiring the SI which is indicated by the indication information is independent of a mode of acquiring the SI which is requested based on the random access preamble.

In an embodiment, an on-demand acquisition device of SI is provided, including: a transmitting circuitry, configured to transmit a random access preamble to a network, and the random access preamble is used at least for requesting the SI; a first acquiring circuitry, configured to acquire indication information related to the SI based on a random access response received from the network; and a second acquiring circuitry, configured to acquire the SI, based on the indication information, from the network in broadcast or unicast mode, and the indication information is used at least for indicating time sequence information and a mode of acquiring the SI.

Embodiments of the present disclosure may provide the following advantages. SI is requested to a network based on a random access preamble, and indication information related to the requested SI is acquired based on a random access response received from the network, so that the SI is acquired, based on the indication information, from the network in broadcast or unicast mode. The interaction process between a UE and the network may further be effectively simplified to realize on-demand acquisition of SI, which additionally reduces signaling overhead during the interaction and avoids a waste of resources.

Furthermore, guide information, where the term "guide information" can be used to indicate the reserved field R in the E/T/R/R/BI MAC sub-header, is added in the random access response sent by the network, to help the UE acquire the information from a portion of or all the fields in the random access response, which may further reduce signaling overhead during an on-demand acquisition processes of SI.

Moreover, the network may know the requested content of the UE based on the received random access preamble. For example, the UE may only request to acquire the SI at this time. In another example, besides acquiring the SI, the UE further requests other operation at this time, e.g., data transmission. Also, the random access preamble may be used for indicating a type of the UE or a group type, so that the network can make a targeted response according to different types of UEs or groups of devices. This information can help the network to better plan and allocate the resources.

DETAILED DESCRIPTION

As described in the background, in the existing techniques, when the UE needs to acquire SI from the network, multiple times of interaction between the UE and the network are required, which causes a large amount of signaling overhead and results in a waste of resources. Moreover, in the existing techniques the network has no way to know whether a random access procedure or an RRC connection is done only for requesting SI or only for data transmission or for both. Such knowledge would help the network to better allocate the resources to respond to a request of the UE.

Figure 1:
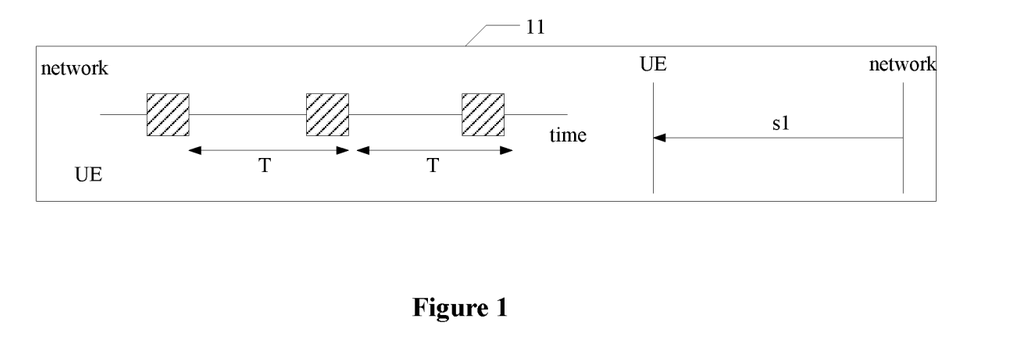
FIG. 1 schematically illustrates a first scene diagram of a UE acquiring SI in existing techniques.
Figure 2:
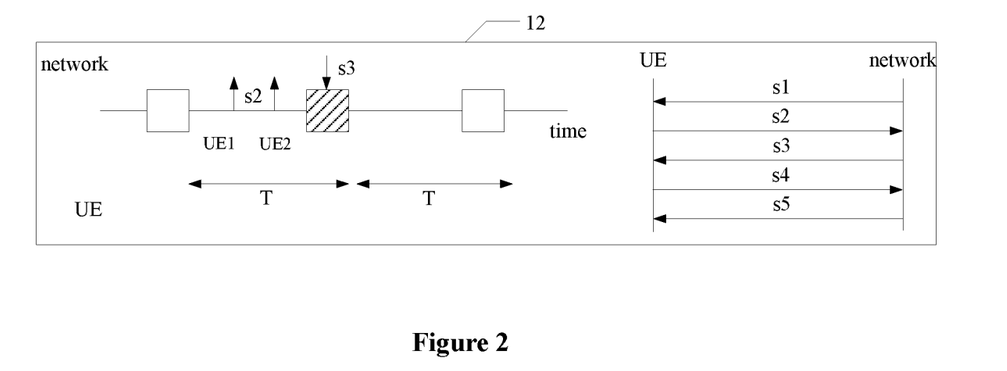
FIG. 2 schematically illustrates a second scene diagram of a UE acquiring SI in existing techniques.
Figure 3:
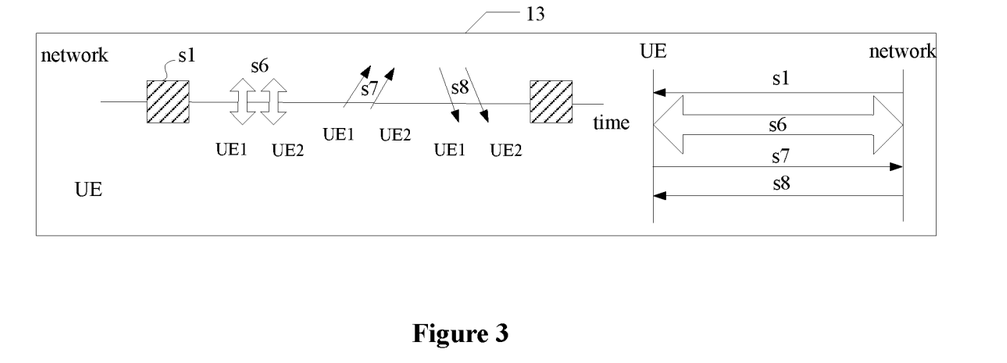
FIG. 3 schematically illustrates a third scene diagram of a UE acquiring SI in existing techniques.

FIGS. 1 to 3 schematically illustrate three scene diagrams of a UE acquiring SI in existing techniques. In an application scenario 11 in FIG. 1, in an application scenario 12 in FIG. 2 and in an application scenario 13 in FIG. 3, a square in a left portion of each diagram (i.e., a diagram for illustrating principle) represents a channel established by the network in advance. Specifically, a shaded square represents a channel being used, and a white square represents an unused channel. A right portion of each diagram (i.e., a flow chart) represents a signaling interaction process between the network and the UE.

In the typical application scenario 11 in FIG. 1, the SI is broadcasted by the network in a fixed period (the network performs s1, broadcasting the SI in the period T), and the UE monitors a broadcast channel all the time to acquire the SI. The SI includes mandatory SI and other SI except the mandatory SI. Those skilled in the art can understand that, the application scenario 11 may be applied, but it is not restricted, to the LTE technology. Alternatively, it may be applied to NR or other technologies.

Those skilled in the art understand that, in the application scenario 11, the SI may be transmitted from the network to the UE in a broadcast mode, which is a wasteful operation mode in practice as the network needs to consume a large amount of resources to broadcast all the SI. However, not all the SI needs to be broadcasted continuously. For example, in a Discontinuous Reception (DRX) mode, the SI broadcasted by the network may not be related to each UE. So a UE would have better sleeping opportunities if it didn't have to constantly monitor the broadcast channel for SI. Furthermore, in practice, in some cases, although the SI the UE has had is outdated, it may be unnecessary to update the SI to a latest accurate version in real time if the old SI is quite similar to the new SI. So, the application scenario 11 is not adapted to practical requirements of the UE.

In the typical application scenario 12 in FIG. 2, the acquisition of the mandatory SI is similar as the application scenario 11. The network still needs to perform s1 including broadcasting the mandatory SI in the period T, while other SI is transmitted in an on-demand broadcast mode according to the request of the UE. Specifically, when UE 1 and UE 2 in an idle mode wish to acquire the other SI, they may send a request to the network, for example, executing s2, transmitting a SI preamble to the network through a physical random access channel to inform the network that they request other SI. After receiving the SI preamble, the network may make a response to the request, for example, executing s3, sending a random access response to the UE to perform an uplink grant. Based on the uplink grant, the UE performs S4, transmitting the SI request to the network. After receiving the SI request, the network performs s5, broadcasting a SI response based on a resource (i.e., the shaded block in the left portion of FIG. 2) for broadcasting SI in a data link which is reserved by the network, so that the UE 1 and the UE 2 can receive the other SI on the broadcast channel. Those skilled in the art can understand that, the application scenario 12 may be applied in new radio technology.

In the new radio technology, SI may be acquired based on the application scenario 13 in FIG. 3. Similar with the application scenario 12, the network still needs to perform s1 including broadcasting the mandatory SI in a fixed period, while other SI is transmitted in an on-demand unicast mode according to the request of the UE. Specifically, when the UE 1 and UE 2 expect to acquire the other SI, they may perform s6, setting up an RRC connection with the network. Afterwards, in s7, they send a SI request to the network based on the RRC connection. Afterwards, in s8, the UE 1 and the UE 2 receive a SI response from the network. Those skilled in the art can understand that, the application scenario 13 may be applied in the new radio technology. Different from the application scenario 12, in the application scenario 13, the UE needs to be in the RRC connection mode, so as to acquire the SI from the network in a unicast mode. In one embodiment, the other SI is transmitted by the network on the RRC connection. The receivers of the other SI only include the UE 1 and the UE 2 who have transmitted the request, and other UEs cannot acquire the other SI.

Those skilled in the art understand that, the application scenarios 12 and 13 may satisfy the demand that the UE does not want to monitor the broadcast channel all the time to acquire the SI to some extent. However, a practical realization procedure of the above scenarios is relatively complicated, where multiple times of interaction between the UE and the network are required to obtain the needed SI. Therefore, a large amount of extra signaling overhead and new information are caused in the network, which easily results in a waste of resources.

To tackle problems in the existing techniques, embodiments of the present disclosure are provided. SI is requested to a network based on a random access preamble, and indication information related to the requested SI is acquired based on a random access response received from the network, where the term "indication information" is used to indicate a portion of or all the fields in the MAC RAR, so that the SI is acquired, based on the indication information, from the network in broadcast or unicast mode. Interaction process between a UE and the network may be effectively simplified to realize on-demand acquisition of SI, which further reduces signaling overhead during the interaction and avoids a waste of resources.

In order to clarify the subject, solutions and advantages of embodiments of the present disclosure, embodiments of present disclosure will be described clearly in detail in conjunction with accompanying drawings.

Figure 4:
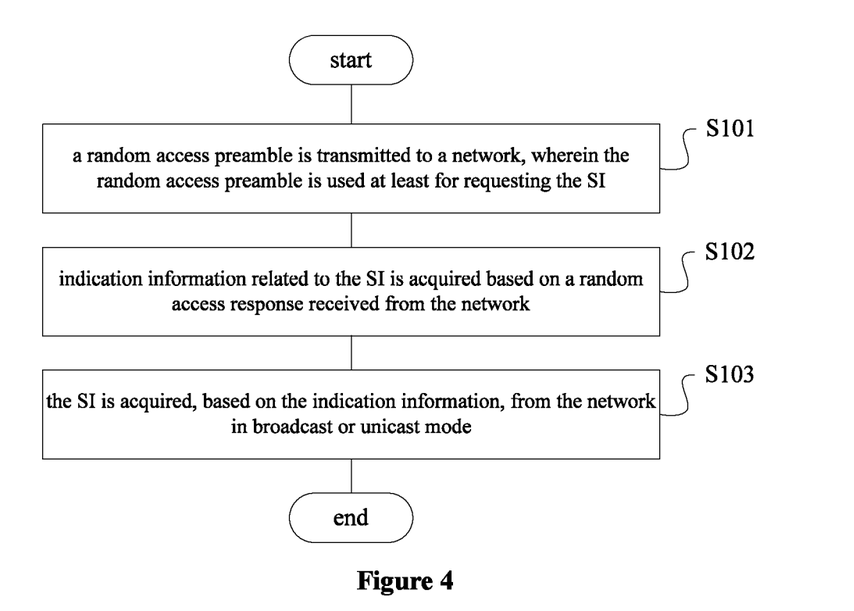
FIG. 4 schematically illustrates a flow chart of an on-demand acquisition method of SI according to a first embodiment.

FIG. 4 schematically illustrates a flow chart of an on-demand acquisition method of SI according to a first embodiment. The SI includes other SI except mandatory SI. The on-demand acquisition indicates that SI needed by a UE is transmitted according to a request of the UE. The request of the UE may include content of the SI. The request of the UE may further include a transmitting mode and time of the SI.

In some embodiments, S101 is performed first. In S101, a random access preamble is transmitted to a network, and the random access preamble is used at least for requesting the SI. Compared with an existing random access preamble for random access, in the embodiment, one or more bits are newly added into a sequence of the random access preamble. In some embodiments, if the UE expects to acquire the SI from the network, one or more bits may be added into the sequence of the random access preamble to be transmitted to the network, so as to create more preamble sequences that are different from the existing ones.

In S102, indication information related to the SI is acquired based on a random access response received from the network. In some embodiments, the random access response corresponds to the random access preamble and includes the indication information. In some embodiments, the indication information is used at least for indicating time sequence information and a mode of acquiring the SI. In some embodiments, the mode of acquiring the SI includes a unicast mode and a broadcast mode. In some embodiments, the time sequence information may include a time and a period of the network transmitting the SI. In some embodiments, the random access response may include further details of the SI.

In S103, the SI is acquired, based on the indication information, from the network in broadcast or unicast mode. In some embodiments, if the indication information indicates to acquire the SI in a broadcast mode, the UE receives the SI transmitted by the network by monitoring a broadcast channel, after receiving the random access response and at a time indicated by the network.

In some embodiments, if the indication information indicates to acquire the SI in a unicast mode, the UE may set up an RRC connection with the network, and receive the SI transmitted by the network in the unicast mode based on the RRC connection.

Furthermore, in the indication information, the network can also indicate whether the SI may be sent in the unicast or broadcast. For example, in the random access preamble, the UE may indicate that it wants to receive SI and send data (which means that it may proceed with an RRC connection). In the random access response, the network can respond that the SI may be sent in the broadcast (along with time sequence information) or that it may be unicasted.

Furthermore, the one or more bits newly added in the sequence of the random access preamble may be used for indicating whether the UE requests other operation besides requesting for acquiring the SI. In some embodiments, the other operation may include the UE transmitting data to the network.

In addition, the one or more bits newly added in the sequence of the random access preamble may be further used for indicating content of the requested SI. For example, the content of the requested SI may be represented in an implicit indication mode, and the UE does not assign which content of SI is expected to be acquired from the network. For another example, the content of the requested SI may be represented in an explicit indication mode, and the UE assigns the content of SI which is expected to be acquired through the newly added one or more bits.

Moreover, the one or more bits newly added in the sequence of the random access preamble may be further used for indicating a type of equipment that transmits the random access preamble. For example, by different values of the newly added one or more bit, the network may know the type of equipment that transmits the random access preamble. In some embodiments, the type of equipment may include UE, Machine-Type Communication (MTC), Station in 802.11 (STA) or Narrow Band Internet of Things (NB-IoT). The one or more bits newly added may further indicate SI pertaining to a group of devices.

In addition, the one or more bits newly added in the sequence of the random access preamble may be further used for indicating in which mode the UE expects to receive the SI. For example, by different values of the newly added one or more bits, the UE may indicate the network that it expects to receive the SI in a unicast mode or in a broadcast mode.

In an exemplary application scenario, the sequence of the random access preamble transmitted in S101 may be divided into a plurality of sub-sets for indicating different content to the network. For example, one sub-set may be used for indicating that only the SI is requested at this time, and the type of equipment transmitting the random access preamble is UE. For another example, another sub-set may be used for indicating that besides requesting the SI, data transmission to the network is also requested at this time. For another example, another sub-set may be used for indicating that only the SI is requested at this time, and the type of equipment transmitting the random access preamble is NB-IoT. For another example, another sub-set may be used for indicating that the type of equipment transmitting the random access preamble is NB-IoT, and besides requesting the SI, data transmission to the network is also requested. Those skilled in the art may make more embodiments according to practical requirements.

Furthermore, by browsing the sub-sets contained in the sequence of the random access preamble, the network may know a purpose (for example, whether the SI is requested; and if the SI is requested, whether other operation is included) of the random access preamble, and further acquire information of equipment transmitting the random access preamble (such as the type of equipment) and a mode in which the equipment transmitting the random access preamble expects to receive the SI.

In some embodiments, if a bit number (64 bits) of the sequence of the random access preamble transmitted by the UE to the network is the same as the existing random access preamble, it is determined that the UE does not request the SI at this time, and the network may make a response based on existing LTE communication specifications. Those skilled in the art can understand that, in the above embodiments, one or more bits are newly added to inform the network that the UE transmitting the random access preamble at least requests the SI.

From the first embodiment, to the UE supporting random access (no matter in an idle state or any other states), the random access preamble for requesting the SI can be transmitted to the network through a random access interface. Besides, if the random access preamble indicates that the UE only requests the SI at this time, the network may not initiate the setup of the RRC connection, so that the UE in any state (idle or other new state) can receive the SI without setting up the RRC connection.

Moreover, in the existing techniques, the random access preamble transmitted by the UE is only used for informing the network that it may transmit the request, while the request is actually transmitted after receiving the random access response from the network. However, in the embodiments of the present disclosure, interaction process between the UE and the network is effectively simplified. The UE adds request information into the random access preamble transmitted to the network initially, and the network may add the indication information related to the request information into the random access response to indicate the UE a time and a mode of receiving the SI. Furthermore, the indication information can also used to indicate that the SI contains beam information, which can be used in MIMO transmission or other beam forming solutions. It can further include information regarding the mode of SI transmission and whether it may be sent in the unicast or broadcast. In this way, on-demand acquisition of SI is realized, which reduces signaling overhead during the interaction and avoids a waste of resources.

Figure 5:
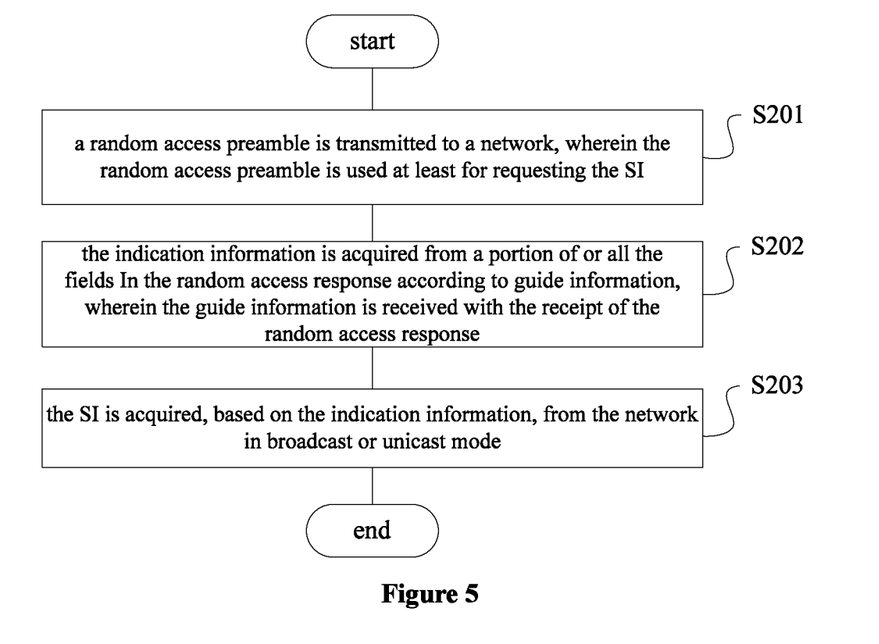
FIG. 5 schematically illustrates a flow chart of an on-demand acquisition method of SI according to a second embodiment.

FIG. 5 schematically illustrates a flow chart of an on-demand acquisition method of SI according to a second embodiment. In some embodiments, S201 is performed first. In S201, a random access preamble is transmitted to a network, and the random access preamble is used at least for requesting the SI. More details about S201 can be referred to S101 in the first embodiment, and are not described in detail here.

Figure 6:
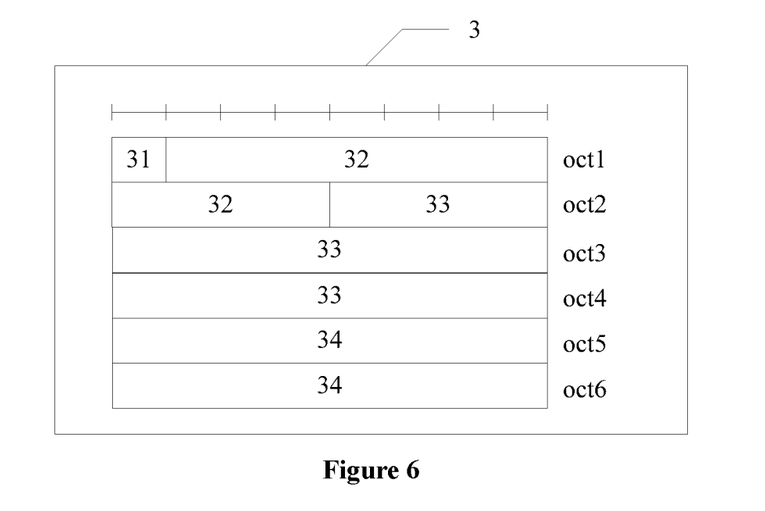
FIG. 6 schematically illustrates a structural diagram of a random access response according to an embodiment.

In S202, the indication information is acquired from a portion of or all the fields in the random access response according to guide information, and the guide information is received with the receipt of the random access response. In some embodiments, the guide information is used for guiding the UE to acquire the indication information from the random access response. Referring to FIG. 6, according to the frame formats in 3GPP, an internal structure of the random access response 3 can be divided into six layers and eight fields. The field 31 is a reserved bit R, the field 32 is a time advance command field, the field 33 is an uplink grant field, the field 34 is a temporary C-RNTI field. In some embodiments, if the guide information indicates that a portion of the fields in the random access response are used to record the indication information, the UE may acquire the indication information from the portion of the fields according to the guide information. In some embodiments, the portion of the fields may include the uplink grant field and/or the time advance command field.

In S203, the SI is acquired, based on the indication information, from the network in broadcast or unicast mode. More details about S203 can be referred to S103 in the first embodiment, and are not described in detail here.

Further, the uplink grant field may be used for indicating a mode in which the UE can acquire the SI.

Further, the time advance command field may include the time sequence information of acquiring the SI.

In some embodiments, in S202, the portion of the fields may further include the reserved bit R, to further provide the UE with information needed by acquisition of the SI.

Those skilled in the art understand that, the portion of the fields such as the uplink grant field, the time advance command field, the reserved bit R can be used for different reasons. For example, the time advance can be used for indicating a mode in which the UE can acquire the SI. Those skilled in the art may make more embodiments according to practical requirements.

In some embodiments, if the guide information indicates that all the fields in the random access response are used to record the indication information, the indication information is acquired from all the fields. In the embodiment, the internal structure of the random access response 3 is re-divided to obtain fields different from those in FIG. 6, so as to provide the UE with more detailed information needed by acquisition of the SI.

Figure 7:
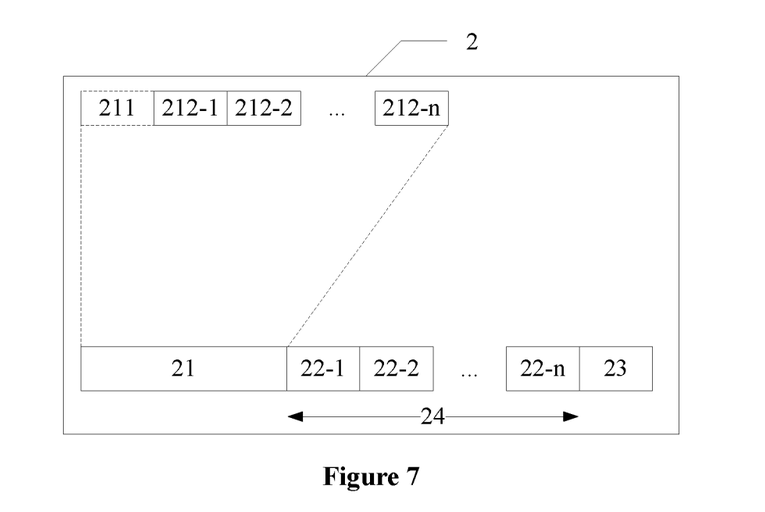
FIG. 7 schematically illustrates a structural diagram of a Medium Access Control (MAC) Protocol Data Unit (PDU) according to an embodiment.

Furthermore, FIG. 7 schematically illustrates a structural diagram of a MAC PDU according to an embodiment. Referring to FIG. 7, a random access response may include a MAC PDU 2. The MAC PDU 2 includes a MAC header 21 and a MAC payload 24. In some embodiments, the MAC payload 24 includes one or more MAC Random Access Response (RAR) 22-1 to 22-n, or does not include a MAC RAR. In some embodiments, the MAC PDU 2 may further include a padding 23.

Figure 8:
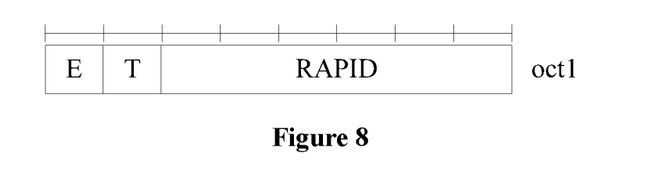
FIG. 8 schematically illustrates a structural diagram of a sub-header of MAC according to an embodiment.

Further, still referring to FIG. 7, the MAC header 21 includes one or more E/T/RAPID MAC sub-header 212-1 to 212-n. Each E/T/RAPID MAC sub-header corresponds to one MAC RAR. For example, the E/T/RAPID MAC sub-header 212-2 corresponds to the MAC RAR 22-2. FIG. 8 schematically illustrates a structural diagram of the E/T/RAPID MAC sub-header according to an embodiment, where E is an extension field, T is a type field, and RAPID is an identifier of the random access preamble.

Figure 9:
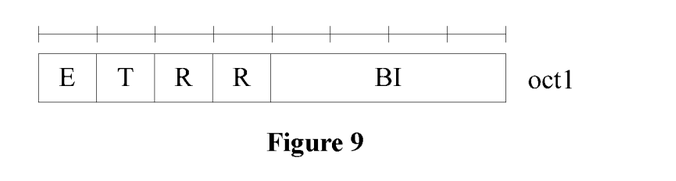
FIG. 9 schematically illustrates a structural diagram of a sub-header of MAC according to another embodiment.

Further, still referring to FIG. 7, the MAC header 21 may further include an E/T/R/R/BI MAC sub-header 211. FIG. 9 schematically illustrates a structural diagram of the E/T/R/R/BI MAC sub-header 211 according to another embodiment, where R is a reserved field, and BI is a Backoff indication field.

In some embodiments, based on FIGS. 7 to 9, the reserved field R in the to E/T/R/R/BI MAC sub-header 211 is taken as the guide information, to inform the UE that the indication information is stored in a portion of or all the fields in the MAC RAR. For example, if the reserved field R indicates that a portion of the fields in the MAC payload 24 (for example, the time advance demand field) include the indication information, the UE may acquire the indication information from the time advance demand field with guidance of the reserved field R, after receiving the random access response. For another example, if the reserved field R indicates that all the fields in the MAC payload 24 record the indication information in a completely new structure, the UE may traverse all the fields in the MAC payload 24 to acquire the indication information with guidance of the reserved field R, after receiving the random access response.

In some embodiments, in the 3GPP, the E/T/R/R/BI MAC sub-header 211 may be a Backoff indication sub-header. In some embodiments, a reserved field in other MAC sub-headers may be taken as the guide information according to practical requirements.

Furthermore, the indication information can also help UE to retrieve the actual SI. For example, if the actual SI is sent in the broadcast channel under a given beam and time, the indication information can be used to let the UE know how to listen to the broadcast channel to acquire the SI.

Based on the second embodiment, the guide information is added in the random access response by the network, to indicate the UE to acquire the indication information from a portion of or all the fields in the random access response, which may further reduce signaling overhead in the on-demand acquisition of the SI. Those skilled in the art should understand that, S202 can be considered as a detailed embodiment of S102. By taking the reserved bit in the random access response as the guide information, the UE is signaled that the indication information is to be acquired from certain fields in the random access response, which may improve efficiency of interaction between the network and the UE.

Figure 10:
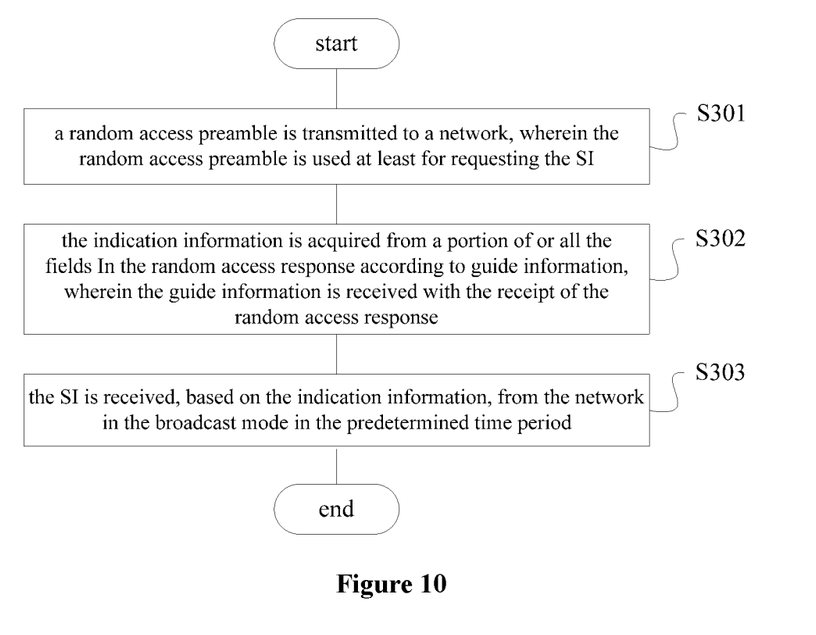
FIG. 10 schematically illustrates a flow chart of an on-demand acquisition method of SI according to a third embodiment.

FIG. 10 schematically illustrates a flow chart of an on-demand acquisition method of SI according to a third embodiment. In some embodiments, S301 is performed first. In S301, a random access preamble is transmitted to a network, and the random access preamble is used at least for requesting the SI. More details about S301 can be referred to S101 in the first embodiment, and are not described in detail here. In some embodiments, one bit newly added in the sequence of the random access preamble indicates that the random access preamble is only used for requesting the SI.

In S302, the indication information is acquired from a portion of or all the fields in the random access response according to guide information, and the guide information is received with the receipt of the random access response. More details about S302 can be referred to S202 in the second embodiment, and are not described in detail here. In some embodiments, the indication information is used for indicating to receive the SI in a broadcast mode in a predetermined time period.

Figure 11:
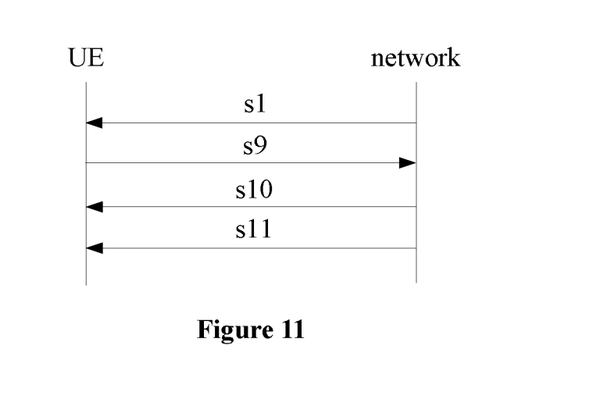
FIG. 11 schematically illustrates a scene diagram of an on-demand acquisition method of SI according to an embodiment.

In S303, the SI is received, based on the indication information, from the network in the broadcast mode in the predetermined time period. In some embodiments, when the predetermined time period comes, the network transmits the SI through a broadcast channel. FIG. 11 schematically illustrates a scene diagram of an on-demand acquisition method of SI according to an embodiment. In the embodiment, the mandatory SI is still broadcasted in a fixed period (the network still needs to perform s1, broadcasting the mandatory SI in the fixed period). To the other SI (i.e., the SI except the mandatory SI), the UE performs s9 including transmitting a random access preamble to the network if necessary. As the random access preamble indicates that the UE only requests the SI at this time, the network performs s10 including transmitting a random access response to the UE and s11 including transmitting the SI in the broadcast channel according to time frequency information contained in the indication information, where the UE acquires the indication information from the random access response according to the guide information, to monitor the broadcast channel in the predetermined time period to acquire the SI.

Compared to the existing technology, the SI in the present disclosure does not need to be sent in a separate message. In some embodiments, the SI can be sent in normal broadcast and be retrieved by the UE according to the indication information sent by the network. For example, the indication information may include such parameters as timing parameters, beam, etc.

In some embodiments, the random access preamble may be transmitted through a physical random access channel.

In some embodiments, the mandatory SI may include information for initial cell access, information for cell selection, information for obtaining other system information. A transmission mode of the mandatory SI may be the same as the existing technique, and is not described in detail here.

Those skilled in the art can understand that, the time sequence information in the embodiments may include a time point when the network starts to transmit the SI in the broadcast channel, and further include a time point when the SI requested by the UE starts to be transmitted in the broadcast channel. In some embodiments, there may be a plurality of UEs requesting SI to the network at the same time, and the SI requested by the UEs is different. To save signaling overhead, the network combines the SI requested by the UEs into a whole and broadcasts it through a same broadcast channel. The plurality of UEs acquire their requested SI respectively by monitoring the broadcast channel.

In the embodiment, if the SI requested by each of the plurality of UEs is a portion of the SI broadcasted by the network, the network may determine the predetermined time period for each UE according to content of the SI requested by each UE, and transmit the predetermined time periods to the UEs through the random access response, so that the UEs can acquire the requested SI from the broadcast channel in the predetermined time periods.

In some embodiments, if the random access preamble includes implicit indication, the predetermined time period may be a first time point when the network starts to transmit the SI in the broadcast channel. The UE determines whether to acquire the SI transmitted in the broadcast channel.

In some embodiments, if the random access preamble includes explicit indication, the predetermined time period may be a second time point when the SI requested by the UE starts to be transmitted in the broadcast channel. In some embodiments, Discontinuous Reception (DRX) of the UE is allowed. Even if the network has already started to transmit the SI through the broadcast channel before to the second time point, the UE can still start to monitor the broadcast channel just at the second time point, to acquire the request SI. In this way, the UE does not need to monitor the broadcast channel all the time.

Furthermore, the network may determine whether to delay the transmission of the SI based on the number of equipment requesting the SI, version update condition of the SI, and difference between SI the equipment has owned and the requested SI. As a result, the time sequence information may be used to indicate that the network decides to delay the broadcast transmission of SI, or the time sequence information may be used to indicate that the network determines to skip the next broadcast, so that a time point in the time sequence information may be long apart from a time point when the UE transmits the random access preamble, or may be different from a time point when the UE wants to request the SI.

For example, if receiving a plurality of requests for the SI from a plurality of UEs, the network may determine to transmit the SI through a broadcast channel, instead of responding to the plurality of UEs one by one.

For another example, if having known that context of the SI (including the mandatory SI and the other SI) may be updated, the network may determine to delay broadcasting.

For another example, if the SI in the broadcast channel after update has few differences with the SI the UE has owned, the network may inform the UE, through the time sequence information, that the network may skip a next SI broadcast. In some embodiments, to a given type of equipment, if confirming that a portion of the requested SI has ignorable difference with the SI the UE has owned, the network may transmit a time point when the portion of the request SI starts to be transmitted as one sub-set of the random access response to the UE, so that the UE determines whether to receive the SI.

In some embodiments, besides requesting the SI, the random access preamble transmitted in S301 is further used for requesting other operation. Prior to or following S303, an RRC connection is set up with the network, and the other operation is performed based on the RRC connection. In some embodiments, the other operation includes transmitting data to the network.

Figure 12:
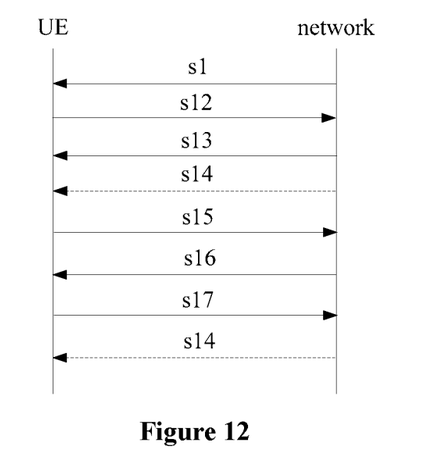
FIG. 12 schematically illustrates a scene diagram of an on-demand acquisition method of SI according to another embodiment.

FIG. 12 schematically illustrates a scene diagram of an on-demand acquisition method of SI according to another embodiment. In the embodiment, the network performs s1 including broadcasting the mandatory SI in a fixed period. To the other SI (i.e., the SI except the mandatory SI), the UE, if necessary, performs s12 including transmitting a random access preamble to the network. As the random access preamble indicates that the UE requests both the SI and the other operation, the network performs s13 including transmitting a random access response with a completely new structure to the UE. The UE acquires the indication information from the random access response with the completely new structure according to the guide information. The indication information indicates the UE to receive the SI in a broadcast mode in a predetermined time period. As a result, when the network performs s14 including transmitting the SI in the broadcast channel according to the time sequence information, the UE monitors the broadcast channel in the predetermined time period to acquire the SI. Besides, the UE and the network may set up an RRC connection through s15 to s17, and other operations may be performed based on the RRC connection.

In some embodiments, the guide information may guide the UE to acquire the indication information from all the fields in the random access response.

In some embodiments, s15 includes the UE transmitting an RRC connection request to the network, s16 includes the network transmitting configuration information of the RRC connection to the UE, s17 includes the UE transmitting response information of the RRC connection to the network based on the configuration information, so as to set up the RRC connection. A setup procedure of the RRC connection is well known in the art, and is not described in detail here.

In one embodiment, s14 may be performed after the RRC connection is set up. For example, the network may determine whether to perform s14 before or after the RRC connection is set up by determining whether the SI to be transmitted is essential for the UE to perform the RRC connection.

Figure 13:
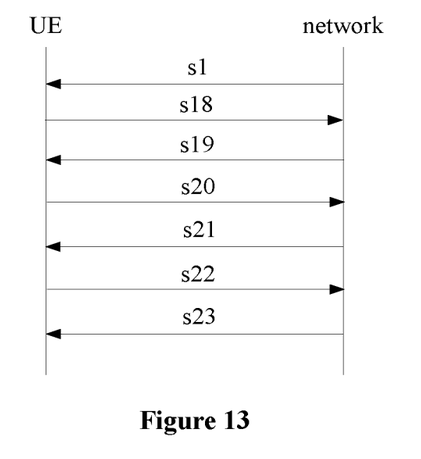
FIG. 13 schematically illustrates a scene diagram of an on-demand acquisition method of SI according to another embodiment.

FIG. 13 schematically illustrates a scene diagram of an on-demand acquisition method of SI according to another embodiment. In the embodiment, the network performs s1 including broadcasting the mandatory SI in a fixed period. To the other SI (i.e., the SI except the mandatory SI), the UE performs s18 including transmitting a random access preamble to the network if necessary. As the random access preamble indicates that the UE requests both the SI and the other operation, the network performs s19 including transmitting a random access response with a same structure as an existing random access response to the UE. The UE acquires the indication information from a portion of fields in the random access response according to the guide information. As the indication information indicates the UE to receive the SI in a unicast mode in a predetermined time period, the UE may perform s20 to s22 to set up the RRC connection with the network. After the RRC connection is set up, the network performs s23 including transmitting the SI according to the time sequence information in a unicast channel which is set up based on the RRC connection. The UE monitors the unicast channel in the predetermined time period to acquire the SI.

In some embodiments, the guide information may guide the UE to acquire the indication information from a portion of the fields in the random access response.

In some embodiments, s20 includes the UE transmitting an RRC connection request to the network, s21 includes the network transmitting configuration information of the RRC connection to the UE, s22 includes the UE transmitting response information of the RRC connection to the network based on the configuration information, so as to set up the RRC connection.

S303 in the third embodiments may be considered as a detailed embodiment of S103 in the first embodiment, or S203 in the second embodiment. The one or more bit newly added in the sequence of the random access preamble may indicate whether the UE requests other operation besides requesting for acquiring the SI, so that the network can make a targeted response to the request of the UE. Further, the random access preamble may be used for indicating a type of the UE transmitting the request, so that the network can make a targeted response according to different types of UE.

In an embodiment, a mode of acquiring the SI which is indicated by the indication information is independent of a mode of acquiring the SI which is requested based on the random access preamble. For example, if the network receives requests from a plurality of UEs at the same time, the SI requested by the UEs is the same, and some of the UEs request to receive the SI in a broadcast mode while some of the UEs request to receive the SI in a unicast mode, the network may determine to respond to the requests of the UEs in a broadcast mode, to avoid responding to the UEs respectively, which may improve the efficiency of interaction between the network and the UEs.

For another example, the SI requested by the UE at this time has few differences with the SI the UE has owned. In this case, even if the UE requests to acquire the SI in a unicast mode, the network may still inform the UE, through the indication information, to wait for subsequent broadcast of the network to acquire the requested SI, and may not transmit the SI to the UE in a broadcast mode or a unicast mode immediately.

For another example, if the SI which the UE requests to acquire in a unicast mode may be updated recently, the network may delay the transmission and transmit the updated SI in subsequent broadcast or unicast, to save uplink resources.

Figure 14:
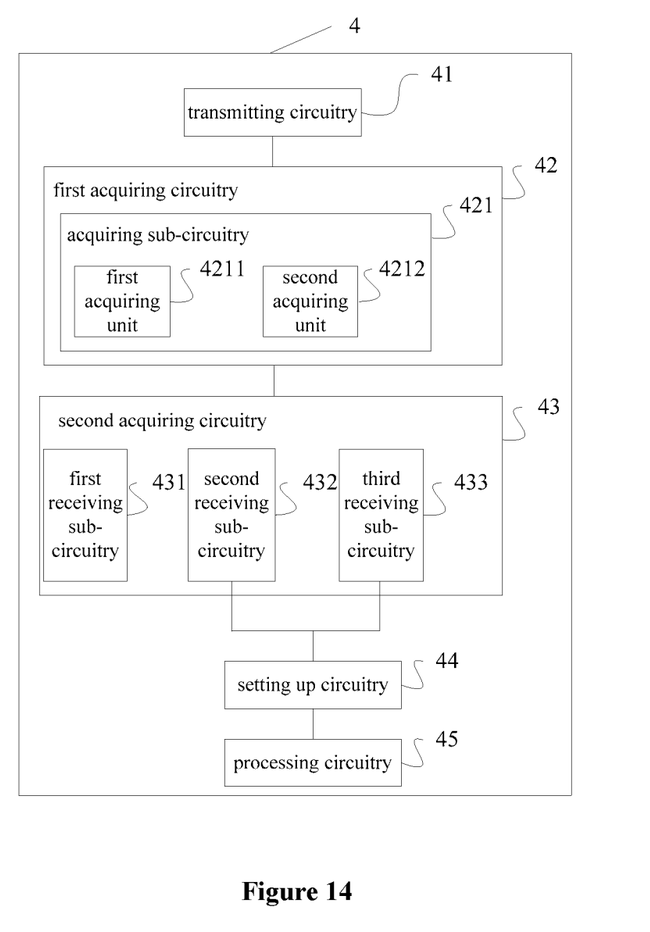
FIG. 14 schematically illustrates a structural diagram of an on-demand acquisition device of SI according to a fourth embodiment.

FIG. 14 schematically illustrates a structural diagram of an on-demand acquisition device of SI according to a fourth embodiment. The on-demand acquisition device 4 of SI may be configured to implement methods in the embodiments shown in FIGS. 1 to 13. Referring to FIG. 14, the device 4 includes: a transmitting circuitry 41, configured to transmit a random access preamble to a network, and the random access preamble is used at least for requesting the SI; a first acquiring circuitry 42, configured to acquire indication information related to the SI based on a random access response received from the network, and the indication information is used for indicating time sequence information and a mode of acquiring the SI; and a second acquiring circuitry 43, configured to acquire the SI, based on the indication information, from the network in broadcast or unicast mode.

In some embodiments, the first acquiring circuitry 42 includes an acquiring sub-circuitry 421, configured to acquire the indication information from a portion of or all the fields in the random access response according to guide information, and the guide information is received with the receipt of the random access response.

In some embodiments, the acquiring sub-circuitry 421 includes a first acquiring unit 4211, configured to: if the guide information indicates that a portion of the fields in the random access response are used to record the indication information, acquire the indication information from the portion of the fields. In some embodiments, the portion of the fields include at least one of an uplink grant field and a time advance command field.

In some embodiments, the random access preamble may be only used for requesting the SI.

In some embodiments, the indication information is used for indicating to receive the SI in a broadcast mode in a predetermined time period, and the second acquiring circuitry 43 includes a first receiving sub-circuitry 431, configured to: receive the SI, based on the indication information, from the network in a broadcast mode in the predetermined time period.

In some embodiments, the random access preamble is used for requesting the SI and other operation. In some embodiments, the other operation includes transmitting data to the network.

In some embodiments, the device 4 may further include: a setting up circuitry 44 configured to: prior to or following acquiring the SI, based on the indication information, from the network in broadcast or unicast mode, set up an RRC connection with the network; and a processing circuitry 45 configured to perform the other operation based on the RRC connection.

In some embodiments, the indication information is used for indicating to receive the SI in a broadcast mode in a predetermined time period, and the second acquiring circuitry 43 includes a second receiving sub-circuitry 432, configured to: receive the SI, based on the indication information, in a broadcast mode in the predetermined time period.

In some embodiments, the indication information is used for indicating to receive the SI in a unicast mode in a predetermined time period, and the second acquiring circuitry 43 includes a third receiving sub-circuitry 433, configured to: receive the SI, based on the indication information, in a unicast mode in the predetermined time period.

In some embodiments, the SI includes other SI except mandatory SI.

In some embodiments, the mode of acquiring the SI which is indicated by the indication information is independent of a mode of acquiring the SI which is requested based on the random access preamble.

In some embodiments, the acquiring sub-circuitry 421 includes a second acquiring unit 4212, configured to: if the guide information indicates that all the fields in the random access response are used to record the indication information, acquire the indication information from all the fields.

In some embodiments, the setting up circuitry 44 and the processing circuitry 45 may be disposed before the second receiving sub-circuitry 432 or the third receiving sub-circuitry 433, to set up the RRC connection with the network before the SI is acquired, based on the indication information, from the network in broadcast or unicast mode, and to perform the other operation based on the RRC connection.

More details about working principles and working modes of the on-demand acquisition device 4 of SI may be referred to the above description of FIGS. 1 to 13, and are not described in detail here.

Those skilled in the art can understand that all of or a portion of the processes in the method provided in the above embodiments can be implemented by related hardware with instruction of computer program. The computer program may be stored in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to embodiments thereof, it should be understood that the disclosure is presented by way of example only, and not limitation. Those skilled in the art can modify and vary the embodiments without departing from the spirit and scope of the present disclosure.

What is claimed is:

1. An on-demand acquisition method of System Information (SI), comprising:
    transmitting a random access preamble to a network, wherein the random access preamble is used at least for requesting the SI;
    acquiring indication information related to the SI based on a random access response received from the network; and
    acquiring the SI, based on the indication information, from the network in broadcast or unicast mode,
    wherein the indication information is used at least for indicating time sequence information and a mode of acquiring the SI,
    wherein guide information is received with the receipt of the random access response and indicates which fields in the random access response record the indication information, and acquiring the indication information related to the SI based on the random access response received from the network comprises: acquiring the indication information related to the SI from the fields indicated by the guide information,
    wherein the random access response comprises a Medium Access Control (MAC) Protocol Data Unit (PDU), the MAC PDU comprises an E (Extension Field)/T (Type Field)/R (Reserved Bit)/R/BI (Backoff Indicator Field) MAC sub-header, and the Reserved Bit Field R in the E/T/R/R/BI MAC sub-header is used to carry the guide information,
    wherein acquiring the indication information related to the SI from the fields indicated by the guide information comprises:
    if the guide information indicates that a portion of the fields in the random access response are used to record the indication information, acquiring the indication information from the portion of the fields; and
    if the guide information indicates that all the fields in the random access response are used to record the indication information, acquiring the indication information from all the fields.

2. The method according to claim 1, wherein the portion of the fields comprise at least one of an uplink grant field and a time advance command field.

3. The method according to claim 1, wherein the random access preamble is only used for requesting the SI.

4. The method according to claim 3, wherein the indication information is used for indicating to receive the SI in a broadcast mode in a predetermined time period, and acquiring the SI, based on the indication information, from the network in broadcast or unicast mode comprises:
    receiving the SI, based on the indication information, from the network in a broadcast mode in the predetermined time period.

5. The method according to claim 1, wherein the random access preamble is used for requesting the SI and other operation.

6. The method according to claim 5, wherein the other operation comprises transmitting data to the network.

7. The method according to claim 5, further comprising:
    prior to or following acquiring the SI, based on the indication information, from the network in broadcast or unicast mode, setting up a Radio Resource Control (RRC) connection with the network; and
    performing the other operation based on the RRC connection.

8. The method according to claim 5, wherein the indication information is used for indicating to receive the SI in a broadcast mode in a predetermined time period, and acquiring the SI, based on the indication information, from the network in broadcast or unicast mode comprises:
    receiving the SI, based on the indication information, in a broadcast mode in the predetermined time period.

9. The method according to claim 5, wherein the indication information is used for indicating to receive the SI in a unicast mode in a predetermined time period, and acquiring the SI, based on the indication information, from the network in broadcast or unicast mode comprises:
    receiving the SI, based on the indication information, in a unicast mode in the predetermined time period.

10. The method according to claim 1, wherein the SI comprises other SI except mandatory SI.

11. The method according to claim 1, wherein the mode of acquiring the SI which is indicated by the indication information is independent of a mode of acquiring the SI which is requested based on the random access preamble.

12. An on-demand acquisition device of System Information (SI), comprising:
    a transmitting circuitry, configured to transmit a random access preamble to a network, wherein the random access preamble is used at least for requesting the SI;
    a first acquiring circuitry, configured to acquire indication information related to the SI based on a random access response received from the network; and
    a second acquiring circuitry, configured to acquire the SI, based on the indication information, from the network in broadcast or unicast mode,
    wherein the indication information is used at least for indicating time sequence information and a mode of acquiring the SI,
    wherein guide information is received with the receipt of the random access response and indicates which fields in the random access response record the indication information, and the first acquiring circuitry comprises an acquiring sub-circuitry configured to acquire the indication information related to the SI from the fields indicated by the guide information,
    wherein the random access response comprises a Medium Access Control (MAC) Protocol Data Unit (PDU), the MAC PDU comprises an E (Extension Field)/T (Type Field)/R (Reserved Bit)/R/BI (Backoff Indicator Field)

MAC sub-header, and the Reserved Bit Field R in the E/T/R/R/BI MAC sub-header is used to carry the guide information, wherein the acquiring sub-circuitry comprises:

a first acquiring unit, configured to: if the guide information indicates that a portion of the fields in the random access response are used to record the indication information, acquire the indication information from the portion of the fields; and a second acquiring unit, configured to: if the guide information indicates that all the fields in the random access response are used to record the indication information, acquire the indication information from all the fields.

13. The device according to claim 12, wherein the portion of the fields comprise at least one of an uplink grant field and a time advance command field.

14. The device according to claim 12, wherein the random access preamble is only used for requesting the SI.

15. The device according to claim 14, wherein the indication information is used for indicating to receive the SI in a broadcast mode in a predetermined time period, and the second acquiring circuitry comprises:

a first receiving sub-circuitry, configured to: receive the SI, based on the indication information, from the network in a broadcast mode in the predetermined time period.

16. The device according to claim 12, wherein the random access preamble is used for requesting the SI and other operation.

17. The device according to claim 16, wherein the other operation comprises transmitting data to the network.

18. The device according to claim 16, further comprising:

a setting up circuitry, configured to: prior to or following acquiring the SI, based on the indication information, from the network in broadcast or unicast mode, set up a Radio Resource Control (RRC) connection with the network; and a processing circuitry, configured to perform the other operation based on the RRC connection.

19. The device according to claim 16, wherein the indication information is used for indicating to receive the SI in a broadcast mode in a predetermined time period, and the second acquiring circuitry comprises:

a second receiving sub-circuitry, configured to: receive the SI, based on the indication information, in a broadcast mode in the predetermined time period.

20. The device according to claim 16, wherein the indication information is used for indicating to receive the SI in a unicast mode in a predetermined time period, and the second acquiring circuitry comprises:

a third receiving sub-circuitry, configured to: receive the SI, based on the indication information, in a unicast mode in the predetermined time period.

21. The device according to claim 12, wherein the SI comprises other SI except mandatory SI.

22. The device according to claim 12, wherein the mode of acquiring the SI which is indicated by the indication information is independent of a mode of acquiring the SI which is requested based on the random access preamble.

* * * * *